United States Patent [19]
Veghte et al.

[11] Patent Number: 5,967,468
[45] Date of Patent: Oct. 19, 1999

[54] CABLE RETAINING CLAMP

[75] Inventors: Richard L. Veghte; Kenneth A. McGiboney, both of Medford, Oreg.

[73] Assignee: Tennaplex Systems, Inc., Medford, Oreg.

[21] Appl. No.: 09/013,807

[22] Filed: Jan. 26, 1998

[51] Int. Cl.$^6$ .................................................. F16B 15/00
[52] U.S. Cl. ........................................................ 248/71
[58] Field of Search ................... 248/71, 73, 72, 248/74.1, 65; 24/17 AP, 16 PB, 295

[56] References Cited

U.S. PATENT DOCUMENTS

| | | | |
|---|---|---|---|
| 2,397,680 | 4/1946 | Morehouse | 248/74 |
| 2,470,814 | 5/1949 | Main . | |
| 2,631,809 | 3/1953 | Jacobson . | |
| 2,682,385 | 6/1954 | Schluter | 248/262 |
| 2,716,703 | 8/1955 | Kane | 250/33.51 |
| 2,941,768 | 6/1960 | Elms et al. | 248/71 |
| 3,131,447 | 5/1964 | Tinnerman | 24/81 |
| 3,154,281 | 10/1964 | Frank | 248/201 |
| 3,237,905 | 3/1966 | Baker et al. | 248/361 |
| 3,345,706 | 10/1967 | Stokes | 24/73 |
| 3,346,863 | 10/1967 | Siebold | 343/702 |
| 3,444,596 | 5/1969 | Soltysik | 24/73 |
| 3,501,117 | 3/1970 | Soltysik | 248/71 |
| 4,334,659 | 6/1982 | Yuda | 248/73 |
| 4,505,006 | 3/1985 | Andre . | |
| 4,572,466 | 2/1986 | Yamaguchi et al. | 248/73 |
| 4,763,132 | 8/1988 | Juds et al. | 343/890 |
| 4,813,639 | 3/1989 | Midkiff et al. | 248/68.1 |
| 4,958,792 | 9/1990 | Rinderer | 248/74.1 |
| 5,393,021 | 2/1995 | Nelson | 248/71 |

FOREIGN PATENT DOCUMENTS

| | | | |
|---|---|---|---|
| 1000677 | 11/1976 | Canada | 248/66 |
| 168882 | 7/1956 | Denmark . | |
| 710034 | 7/1941 | Germany . | |
| 2807119 | 8/1979 | Germany . | |
| 1062633 | 3/1963 | United Kingdom . | |

*Primary Examiner*—Ramon O. Ramirez
*Attorney, Agent, or Firm*—Flehr Hohbach Test Albritton & Herbert LLP

[57] ABSTRACT

A cable retaining clamp for securing a cable to a support structure. The clamp includes a cable holder having a pair of arms positionable around a cable. A retainer extends from each of the arms. The retainer includes a body portion and at least one tab extending from the body portion. The tab is folded around the outer surface of the body portion such that when the retainer is inserted through an aperture in a support surface, the tab engages the support structure around the aperture to resist removal of the retainer from the aperture.

11 Claims, 6 Drawing Sheets

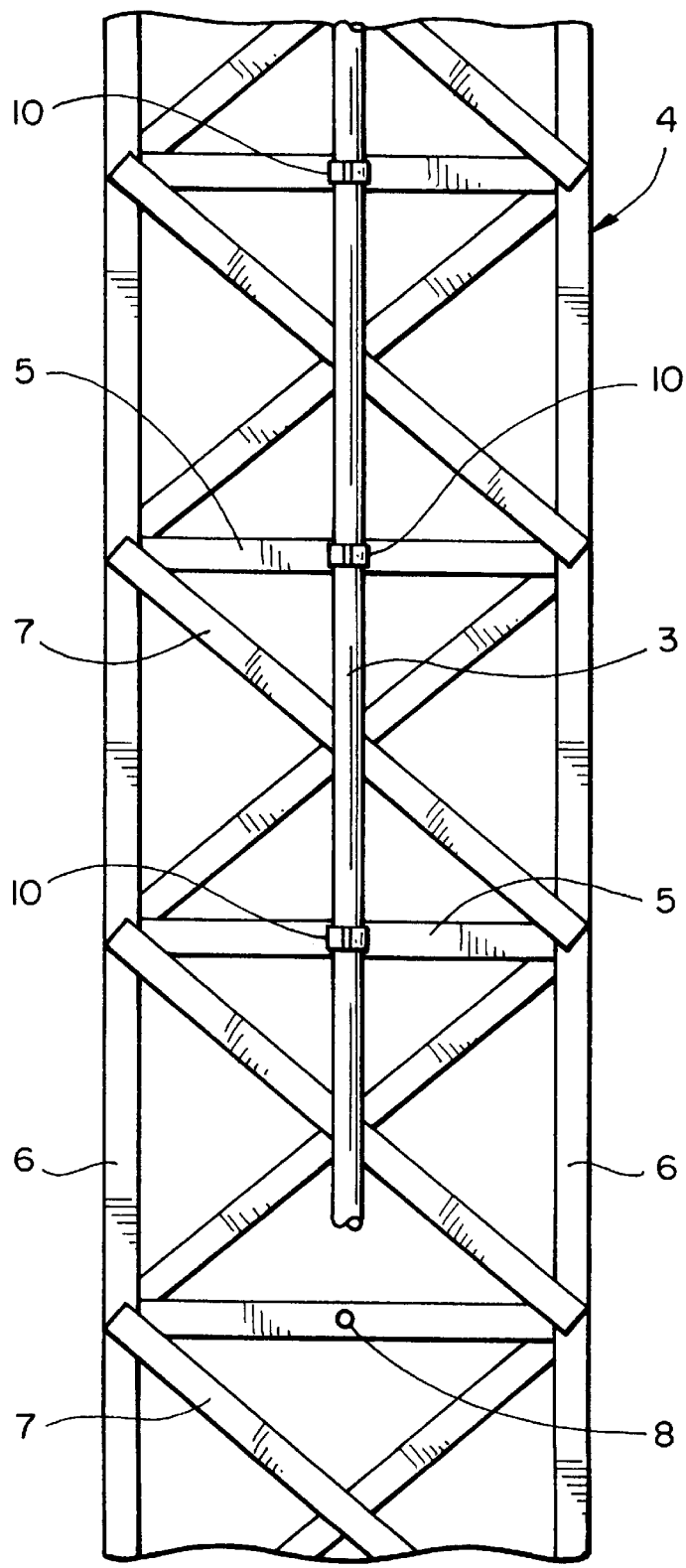
FIG_1

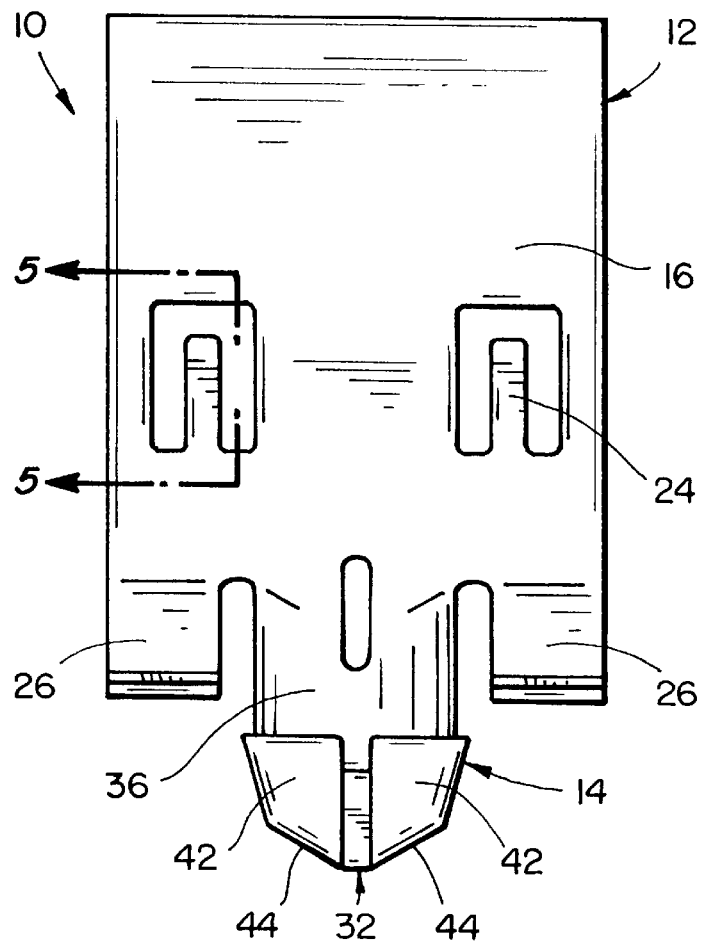
FIG_2
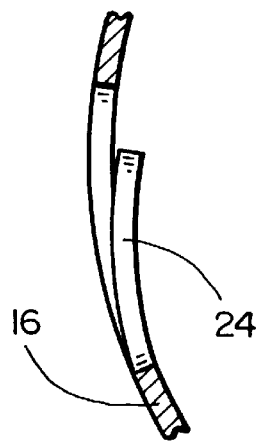
FIG_5

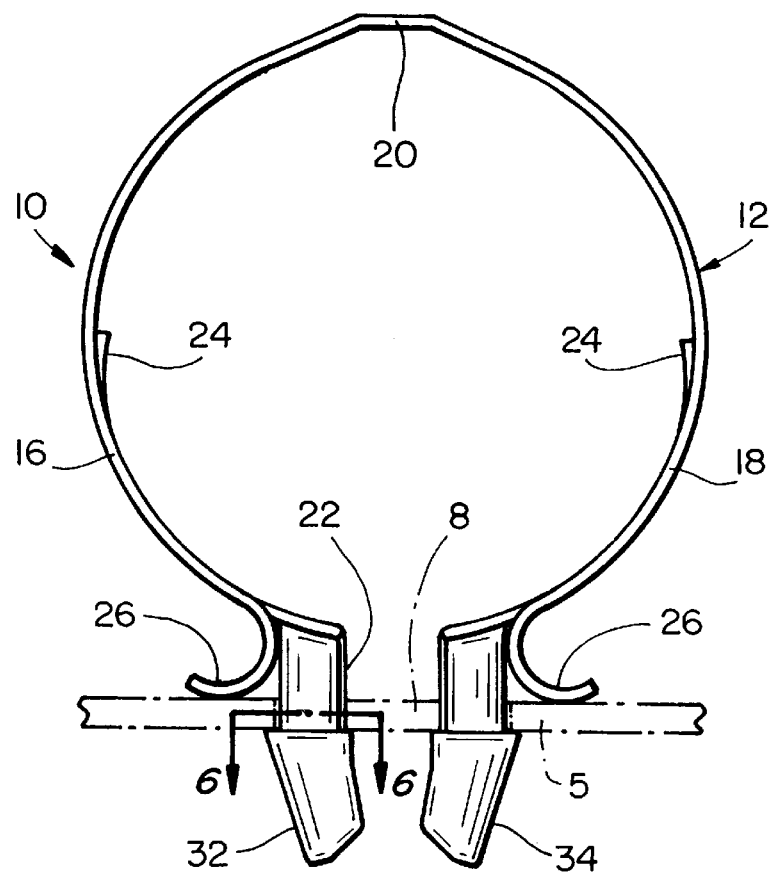
FIG_3
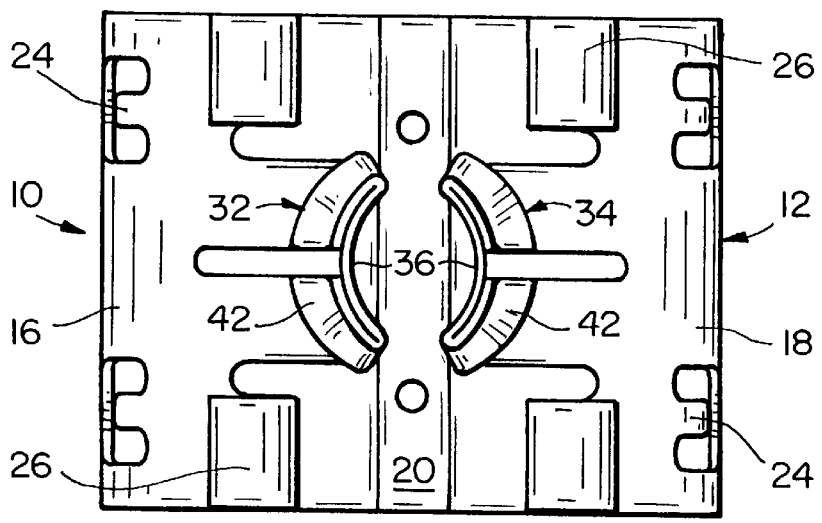
FIG_4

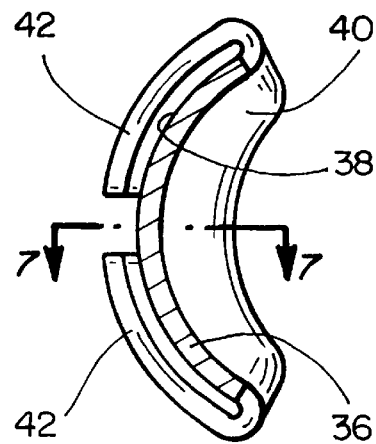
FIG_6
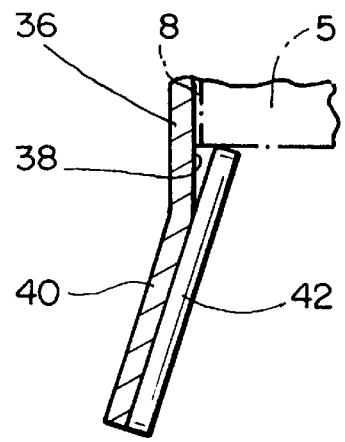
FIG_7
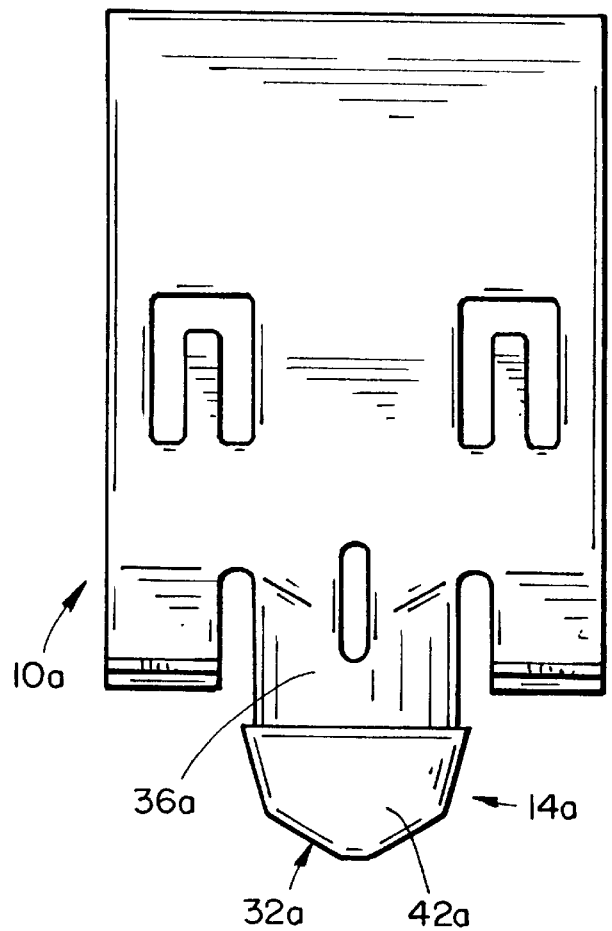
FIG_8

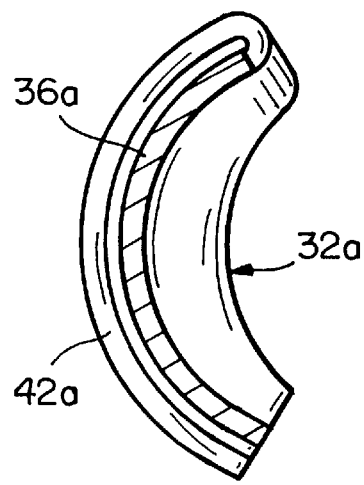
FIG_9
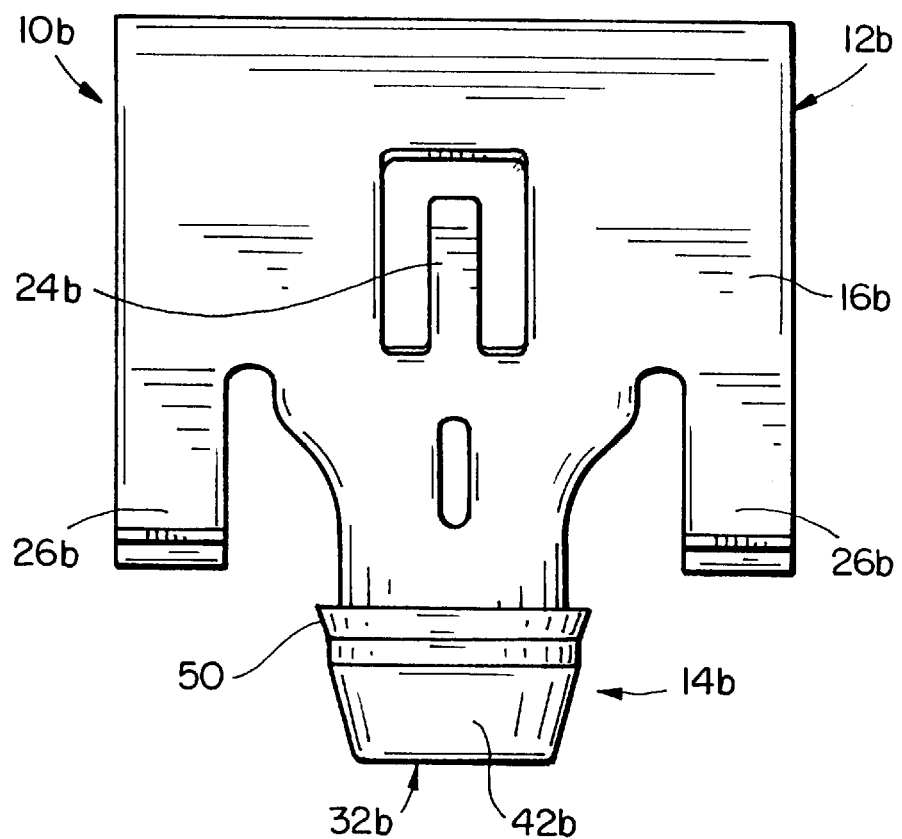
FIG_10

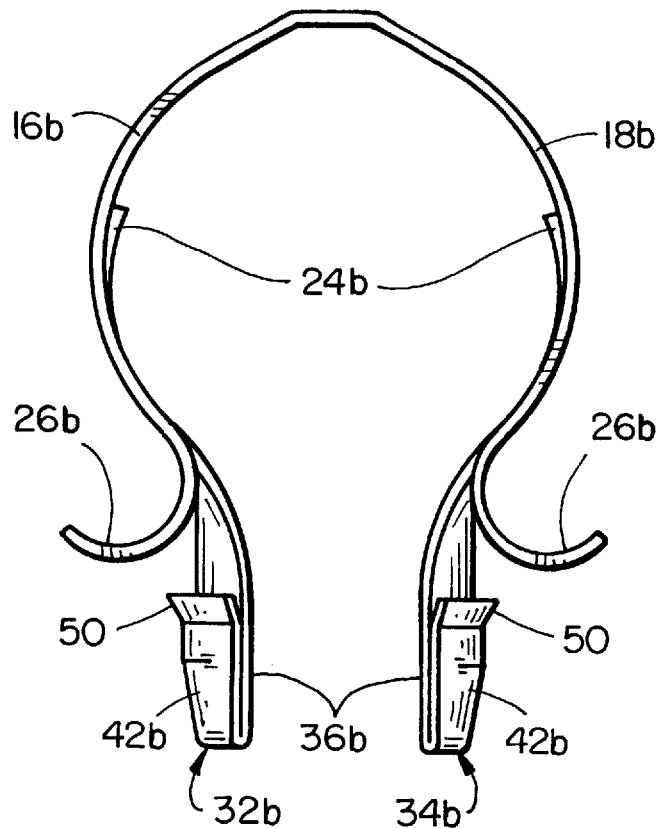
FIG_11
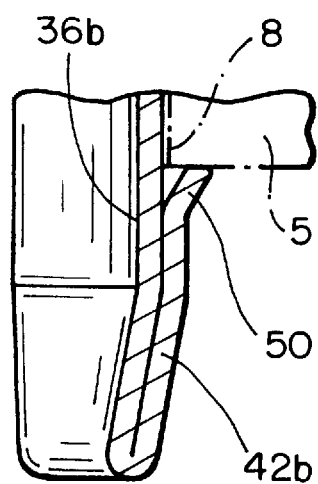
FIG_12

CABLE RETAINING CLAMP

TECHNICAL FIELD

The present invention relates in general to a retaining clamp and, more particularly, to a retaining clamp for securing a cable or waveguide to a support structure.

BACKGROUND OF THE INVENTION

Cable retaining clamps are typically used in the installation of antennas and the like to secure the antenna cable to a support structure. Often, the support structure is a tall tower and the cable is mounted to the tower at several locations between the base and top of the tower. The retaining clamp used to mount the cable to the support structure must securely hold the cable in place and must not damage the cable. Conventionally, cables were installed using a variety of hardware requiring the attachment of bolts, screws or other fasteners to the support structure. Considerable time and effort is required to mount such conventional fasteners to the support structure, increasing the installation expense and prolonging the exposure of the installer to unsafe working conditions.

Cable hangers for mounting a cable to a support structure without the use of the time-consuming fasteners are available. U.S. Pat. No. 4,763,132 discloses an example of a cable hanger for an elliptical waveguide in which the legs of the hanger are slipped around the waveguide and snapped into a hole in the support structure. Detents on the exterior of the hanger legs engage the surface of the support structure adjacent the hole to resist extraction of the hanger from the hole. The disclosed hanger may be installed in a one step without the use of time consuming fasteners. However, the hanger will not adequately engage the support structure unless the detents contact the surface of the support structure. To ensure this contact occurs, both the holes formed in the support structure and the detents must meet strict tolerances. However, the holes drilled in the support structure and the surface of the support around the hole often include protuberances or other irregularities which interfere with the ability of the detents to adequately engage the support structure. Forming the detents to the necessary tolerances on the exterior of the legs increases the cost of manufacture of the hanger.

U.S. Pat. No. 5,393,021 discloses another example of a cable hanger which is snapped into a hole formed in the support structure. The cable is inserted into cable retention section of the hanger, and the legs of the cable retention section are inserted into the hole in the support structure. The side edges of each leg is provided with a locking barb which engages the inner surface of the support structure. The exterior of the legs are concave in shape, opposite the circular contour of the hole, such that the barbs contact the support structure at four discrete locations. This method of attachment is intended to provide contact between at least some of the barbs and the support structure even when there are irregularities in the hole or the surface of the support structure. However, the amount of engagement between the barbs and the support structure is limited. If any of the barbs or leg portions become bent or damaged during shipping and handling, the locking members of the hanger may not function properly.

A cable retaining clamp which may be used to securely and efficiently mount a cable to a support structure is desirable. A cable retaining clamp which engages extended portions of the support surface around the hole is also desirable. Similarly, a cable retaining clamp which engages the support structure at a location spaced from the perimeter of the aperture is desirable. Furthermore, a cable retaining clamp which may be economically manufactured would be of particular advantage.

OBJECTS AND SUMMARY OF THE INVENTION

It is a primary object of this invention to provide a cable retaining clamp for anchoring a cable to a support structure.

It is a further object of this invention to provide a cable retaining clamp which may be efficiently positioned around a cable and snapped onto a support structure to secure the cable to the support structure.

It is another object of this invention to provide a cable retaining clamp which is snapped into a hole formed in the support and held in place by a retainer which engages extended portions of the surface around the hole formed in the support structure.

It is still another object of this invention to provide a cable retaining device which is snapped into a hole formed in the support and held in place by a retainer which engages the support structure at a location spaced from the perimeter of the aperture.

A more general object of the invention is to provide a cable retaining clamp which may be economically and efficiently manufactured, and which is easy to install.

In summary, this invention provides a cable retaining clamp for efficiently and securely attaching a cable to a support structure, such as a tower. The clamp includes a cable holder with a pair of arms which are positioned around a cable to hold the cable. A retainer extends from each arm and includes a body portion and at least one tab extending from the body portion. The tab is folded around the outer surface of the body portion such that when the retainer is inserted through an aperture in a support surface, the tab engages the support structure around the aperture to resist removal of the retainer from the aperture.

Additional objects and features of the invention will be more readily apparent from the following detailed description and appended claims when taken in conjunction with the drawings.

BRIEF DESCRIPTION OF THE DRAWINGS

FIG. 1 is a pictorial view of a cable retaining clamp constructed in accordance with the present invention, shown attaching a cable to a support structure.

FIG. 2 is a front plan view of the cable retaining clamp of FIG. 1.

FIG. 3 is an end view of the cable retaining clamp of FIG. 1.

FIG. 4 is a bottom view of the cable retaining clamp of FIG. 1.

FIG. 5 is an enlarged cross-sectional view taken substantially along line 5—5 of FIG. 2.

FIG. 6 is an enlarged cross-sectional view taken substantially along line 6—6 of FIG. 3.

FIG. 7 is an enlarged cross-sectional view taken substantially along line 7—7 of FIG. 6.

FIG. 8 is a front plan view of a cable retaining clamp in accordance with another embodiment of the invention FIG. 9 is a cross-sectional view similar to FIG. 6 of the cable retaining clamp of FIG. 8.

FIG. 10 is a front plan view of a cable retaining clamp in accordance with another embodiment of the invention.

FIG. 11 is an end view of the cable retaining clamp of FIG. 10.

FIG. 12 is a cross sectional view similar to FIG. 7 of the cable retaining clamp of FIG. 10.

DETAILED DESCRIPTION OF THE INVENTION

Reference will now be made in detail to the present embodiments of the invention, which are illustrated in the accompanying Figures. Turning now to the drawings, wherein like components are designated by like reference numbers throughout the various Figures, attention is directed to FIG. 1.

Cable retaining clamp 10, constructed in accordance with the present invention, is particularly suitable for anchoring a cable 3, such as the cable of an antenna, to a support structure such as a tower 4. By way of example, the tower 4 in FIG. 1 consists of a framework including horizontal beams 5 mounted to vertical supports 6 and diagonal struts 7 for reinforcing the structure. However, it is to be understood that the design of the support structure with which the clamp 10 is used is not to be limited to the tower 4 shown in FIG. 1. Moreover, instead of a tall tower, the clamp 10 may be used to anchor cables and the like to other types support structures. The cable attached to the structure may have a horizontal or inclined orientation instead of the vertical orientation shown in FIG. 1. In the application shown in FIG. 1, a retaining clamp 10 attaches the cable 3 to each horizontal beam 5 in succession. However, the number of retaining clamps 10 used to attach a cable to a support structure will depend on the constraints imposed by the particular application.

As is discussed in more detail below, the retaining clamp 10 is attached to the tower 4 by inserting a retention portion of the clamp through an aperture or hole 8 formed in the horizontal beam 5. Apertures may be formed in the horizontal beams 5 prior to assembly of the tower 4 or the apertures may be formed after the tower 4 is installed and the exact location of the cable 3 relative to the tower is determined. The apertures 8 may be formed by drilling or any other suitable means. Instead of attaching the clamp to the beam 5, it is to be understood that the retaining clamp 10 may be attached to other components of the tower framework.

Turning to FIGS. 2–7, the cable retaining clamp 10 generally includes a cable holder 12 and a retaining device 14. Preferably, the retaining clamp 10 is unitary member with sections of the unitary member providing the cable holder 12 and retaining device 14. In the present embodiment, the retaining clamp 10 is formed of sheet metal by stamping, punching or otherwise generating a blank and then bending the blank to the shape shown in FIGS. 2–7. However, it is to be understood that a cable retaining clamp in which the cable holder and retaining device are initially separate components is within the scope of this invention.

Cable holder 12 includes a pair of arms 16, 18 which wrap around and hold the cable 3. The holder 12 is preferably shaped complementary to the exterior shape of the cable 3 with which the retaining clamp 10 is used. Thus, in the illustrated embodiment, the cable 3 has a circular cross section and the arms 16, 18 of the cable holder 12 are rounded, generally following the profile of the cable exterior. For cables of other cross-sectional shape, the shape of the arms may be modified to follow the exterior contour of the cable. The proximal ends of the arms 16, 18 are joined together by a flat connecting portion 20, although it is to be understood that the arm 16 may be directly joined to the arm 18 in other modifications of the invention. The distal ends of the arms 16, 18 are separated by a gap 22. The gap 22 defines the open end of the cable holder through which the cable 3 is inserted into the cable holder 12. The connecting portion 20 provides a hinge about which the arms 16, 18 may be pivoted, allowing the arms 16, 18 to be moved outwardly expanding the size of gap 22 to insert the cable into the holder 12 and moved inwardly when the retaining device 14 is inserted through the aperture 8 in the tower 4. In the present embodiment, the arms 16, 18 are each inclined at an angle of about an angle of 135° to 145°, for example 140°, relative to the connecting portion 20 prior to attachment of the clamp 10 to the tower. After the retaining device 16 has been inserted through the aperture, the arms 16, 18 are compressed to an angle of 115° to 125°, for example 120°, relative to the connecting portion.

To hold the cable 3 in place within the cable holder 12, the cable holder includes fingers 24 bent inwardly from the arms 16, 18. The fingers 24 press against the exterior of the cable 3 to prevent shifting of the cable 3. In the clamp 10 shown in FIGS. 2–7, each arm 16, 18 includes two fingers 24. However, in other modifications of the invention a greater or lesser number of fingers 24 may be employed and the finger or fingers may be provided on only one arm instead of both arms 16, 18. The fingers 24 are formed by removing U-shaped sections of the arms and then bending the finger 24 inwardly relative to the arm. As shown particularly in FIG. 3, the tips of the fingers 24 are substantially aligned with the center axis of the cable holder 12 for maximum effectiveness. It is to be understood that the location of the fingers 24 is subject to variation within the scope of this invention.

The retaining clamp 10 includes a plurality of resilient supporting members 26 extending from the cable holder 12. The clamp 10 of the embodiment of FIGS. 2–7 includes four supporting members 26, two extending from each arm 16, 18 on opposite sides of the retaining device 14. While four supporting members 26 are particularly effective, it is to be understood that the number of supporting members 26 may be increased or decreased if desired. When the clamp 10 is installed, the supporting members 26 are pressed against the front surface of the support structure. The resilient supporting members 26 act as springs urging the cable holder 12 away from the beam 5 to ensure the retaining device 14 is retained in engagement with the back surface of the beam as is discussed in more detail below. The supporting members 26 also limit side-to-side rocking of the clamp 10 relative to the tower so that the cable 3 is securely held in the desired orientation. In the illustrated embodiment, the supporting members 26 are provided by extensions of the arms 16, 18 which are curled outwardly and upwardly into the shape of a semicircle. The radius of curvature of the support members 26 is about 0.150 to 0.160 inches, for example 0.157 inches. However, it is to be understood that this radius of curvature may be increased or decreased if desired.

The retaining device 14 is used to attach the clamp 10 to the horizontal beam 5 or other support structure. As shown particularly in FIG. 3, the retaining device 14 includes a retainer or locking member 32, 34 joined to each arm 16, 18. The retainers 32, 34 are substantially identical and only retainer 32 will be described in detail with the description applying equally to the retainer 34. The retainer 32 includes a stem or body portion 36 which extends from the distal end of the arm 16 and passes through the aperture 8 when the clamp 10 is mounted to the tower. The stem 36 is curved such that the outer surface 38 follows the circular contour of the aperture 8. The end 40 of the stem 36 is tapered inwardly, toward the opposite retainer 34. In this embodiment, the end 40 is inclined at an angle of about 155° to 165°, for example 161°.

At least one tab 42 is joined to the stem 34 and folded such that it overlaps the exterior of the stem 36. In the embodiment of FIGS. 2–7, the retainer 32 includes two tabs 42 which are joined to the side edges of the stem 36. Both tabs 42 are folded back around the stem 36. However, the tabs 42 may take different forms as is shown for example by the embodiments of FIGS. 8–9 and 10–12. The folded tabs 42 are substantially parallel to the tapered end 40 of the stem 36. The tabs 42 have a height greater than the height of the tapered end 40 such that the upper ends of the tabs 42 deviate from the contour of the stem 36 such that the upper end of the tab 42 is spaced outwardly of the outer surface 38 of the axial portion of the stem as shown particularly in FIG. 7. With the clamp of FIGS. 2–7, the outer edge of the upper end of the tab 42 is positioned 0.065 to 0.075 inches, for example 0.070 inches, from the exterior 38 of the stem. The distance between the upper end of the tab 42 and the axial portion of he stem 36 may be increased by providing the tab with an outward-directed flange (not shown).

When the clamp 10 is installed, the exterior of the stem 36 is urged against the edge of the aperture 8 and the upper ends of the tabs 42 engage the beam 5 at a location spaced from the perimeter of the aperture 8. Positioning the upper end of the tab 42 away from the perimeter of the aperture 8, even by a small distance, ensures that the tab 42 securely engages the surface of the beam 5 to prevent unintentional extraction of the retaining device 14 from the aperture. If irregularities are formed on he wall of the aperture, preventing the exterior of the stem 36 from engaging the beam the separation of the tab 42 from the stem ensures the tabs will engage the beam around these irregularities. Although separating the upper end of the tab 42 from the exterior of the stem 36 is preferred, it is to be understood that in other modifications of the invention the upper end of the tab may be positioned against the outer surface of the stem.

As is shown particularly in FIG. 6, each tab 42 the extends almost to the center axis of the stem 36, the tabs terminating vicinal the center axis. Thus, the tabs 42 extend substantially the entire width of the stem 36, being separated by only a small gap of about 0.094 inches. It is to be understood that the size of this gap may be increased or decreased. The arcuate extent of the tabs 42 provides a substantial area where the retainer 32 can engage the inner surface of the beam 5. This available contact area ensures the tabs 42 will securely engage the beam 5 even if there are irregularities in the surface finish of the beam.

As discussed above, the stem 36 and tabs 42 are tapered or inclined inwardly toward the opposite retainer. As shown in FIG. 2, the end of the retainer 32 also includes chamfers 44 which extend upwardly and outwardly from the central region of the stem. In the illustrated embodiment, the chamfers are at an angle of about 25° to 35°, for example 30°; although the angle of the chamfer may be increased or decreased.

The clamp 10 is attached to the horizontal beam 5 by inserting the retaining device 14 through the aperture 8. The chamfers 44 and the inclined configuration of tapered end 40 and tabs 42 facilitate installation of the clamp 10. As the retaining device 14 is inserted into the aperture 8, the chamfers 44 and inclined surface of the tabs 42 slide along the edge of the aperture, urging the retainers 32, 34 and arms 16, 18 toward one another so that the upper ends of the tabs 42 will fit through the aperture. After the tabs have passed through the aperture, the arms 16, 18 are allowed to partially return to their natural position. This outward expansion of the arms 16, 18 urges the exterior of the stems 36 against the edge of the aperture. As the retaining device 14 is moved through the aperture, depending on beam thickness, the supporting members 26 can contact the beam 5 and can be slightly compressed by the beam before the tabs have moved through the aperture. When the installation force is removed, the supporting members expand toward their initial condition, pulling the tabs 42 against the inner surface of the beam 5. The upper edges of the tabs 42 engage the beam 5 around the aperture, securely holding the retainer in place.

FIGS. 8 and 9 show another embodiment of a cable retaining clamp 10a in accordance with this invention. Clamp 10a includes a retaining device 14a which includes a stem 36a and one tab 42a joined to one side of the stem 36a. The tab 42a is folded such that the tab 42a extends across the entire outer surface of the stem 36a, providing a substantial area of contact between the retainer 32a and the beam 5. In other respects, the clamp 10a is substantially identical to the clamp 10 shown in FIGS. 2–7.

Another embodiment of a retaining clamp 10b of this invention is shown in FIGS. 10–12. Cable retaining clamp 10b includes a cable holder 12b having a single finger 24b formed in each arm 16b, 18b. The finger 24b is substantially aligned with the center line of the arms 16b, 18b, although it is to be understood that the location of the finger 24b is subject to variation. Four supporting members 26b are carried by the cable holder 12b. In this modification of the invention, the supporting members 26b have a radius of curvature of 0.130 to 0.200 inches, for example 0.169 inches.

The retainers 32b, 34b of retaining device 14b include a stem or body portion 36b. The retainer includes a single tab 42b which is joined to the lower edge of the stem 36b. The tab 42b is folded or bent upwardly against the exterior of the stem 36b. In the embodiment of FIGS. 10–12, the tab 42b is bent against the axial portion of the stem 36b and the upper edge of the tab 42b is provided with a flange 50 which juts outwardly from the stems 36b to provide a gap between the upper edge of the tab 42b and the exterior of the stem. Thus, when the clamp 10b is installed, the upper edge of the beam 5 at a location positioned slightly inwardly of the perimeter of the aperture.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is to be understood that the features of the different embodiments of this invention are not to be limited to the clamp configuration of the particular embodiment. It is intended that the scope of the invention be defined by the Claims appended hereto and their equivalents.

What is claimed is:

1. An RF cable retaining clamp for securing a cable to a support structure, said retaining clamp comprising:

a shaped sheet metal cable holder having a pair of sheet metal arms positionable around a cable to engage the cable; and an integral sheet metal retainer extending from each of said arms, said retainer including curved body portions and at least one integral sheet metal tab extending from each of said body portions, each of said body portions having an inner surface facing the body portion of the opposite arm and an outer surface, each of said tabs being folded around said outer surface of its respective body portion to provide an edge which faces said arms such that when said retainer is inserted through an aperture in a support surface, the said edge of said tabs engage said support structure around said aperture to resist removal of said retainer from the aperture.

2. The cable retaining clamp of claim 1 in which said tab is of a size such that said tab is coextensive with said body portion of said retainer.

3. The cable retaining clamp of claim 1 in which the said edge of each of said tabs is spaced outwardly of said body portion.

4. The cable retaining clamp of claim 1 in which said curved body portions have an arcuate shape such that when said retainers are inserted into an aperture in a support structure, said outer surface of said body portion engages the support structure.

5. The cable retaining clamp of claim 1 in which at least one of said arms includes at least one finger bent inwardly relative to said arm to apply pressure to a cable positioned between said arms.

6. The cable retaining clamp of claim 1 in which said cable holder includes a planar connecting portion between said arms.

7. The cable retaining clamp of claim 1, and further comprising at least one sheet metal supporting member extending from said arm, said supporting member being shaped and positioned to engage a front surface of a support structure when said retainers are inserted through an aperture formed in the support structure to pull said tabs into engagement with a back surface of the support structure.

8. An RF cable retaining clamp for securing a cable to a support structure, said retaining clamp comprising:

a shaped sheet metal cable holder having an open end for insertion of a cable into said cable holder, a closed end, and sheet metal arms extending between said open and closed ends; and an integral sheet metal retaining device insertable into an aperture in a support structure for attaching said cable holder to the support structure, said retainer assembly including a first integral sheet metal locking member coupled to one of said arms of said cable holder and a second integral sheet metal locking member coupled to the other of said arms of said retainer body, said first and second locking members each including an integral sheet metal stem portion and integral sheet metal side portions overlapping said stem portion, said side portions engaging the support structure around the aperture formed therein when said retaining device is inserted into said aperture.

9. The cable retaining clamp of claim 8 in which said side portions each have an upper edge spaced outwardly of said stem portion.

10. The cable retaining clamp of claim 9 in which said cable holder includes sheet metal fingers bent inwardly relative to said arms to apply pressure to a cable positioned in said cable holder.

11. The cable retaining clamp of claim 10 in which said cable holder includes sheet metal prongs extending outwardly from said arms, said prongs engaging a front surface of the support structure when said retaining device is inserted through said aperture.

\* \* \* \* \*